(12) United States Patent
Yan et al.

(10) Patent No.: US 8,553,043 B2
(45) Date of Patent: Oct. 8, 2013

(54) THREE-DIMENSIONAL (3D) IMAGE PROCESSING METHOD AND SYSTEM

(75) Inventors: Fei Yan, Shenzhen (CN); Ning Liu, Shenzhen (CN)

(73) Assignee: SuperD Co. Ltd., Shenzhen (CN)

( * ) Notice: Subject to any disclaimer, the term of this patent is extended or adjusted under 35 U.S.C. 154(b) by 476 days.

(21) Appl. No.: 12/905,108

(22) Filed: Oct. 15, 2010

(65) Prior Publication Data

US 2012/0013600 A1    Jan. 19, 2012

(30) Foreign Application Priority Data

Jul. 14, 2010    (CN) .......................... 2010 1 0226217

(51) Int. Cl.
G06T 9/00 (2006.01)
G06K 9/20 (2006.01)
G06K 9/36 (2006.01)
H04N 13/00 (2006.01)

(52) U.S. Cl.
USPC .............................. 345/555; 382/282; 348/42

(58) Field of Classification Search
None
See application file for complete search history.

(56) References Cited

U.S. PATENT DOCUMENTS

| 5,644,661 | A  | * | 7/1997  | Smith et al. ............... 382/300 |
| 6,341,179 | B1 | * | 1/2002  | Stoyle et al. ............... 382/254 |
| 7,457,038 | B2 | * | 11/2008 | Dolgoff ...................... 359/619 |
| 8,175,387 | B1 | * | 5/2012  | Hsieh et al. ................. 382/181 |
| 2009/0128620 | A1 | * | 5/2009 | Lipton et al. ................ 348/42 |
| 2010/0128168 | A1 | * | 5/2010 | Zhen et al. ............... 348/420.1 |
| 2010/0271377 | A1 | * | 10/2010 | Low et al. .................. 345/531 |

* cited by examiner

*Primary Examiner* — Kee M Tung
*Assistant Examiner* — Haixia Du
(74) *Attorney, Agent, or Firm* — Anova Law Group, PLLC

(57) ABSTRACT

A three-dimensional (3D) image processing method is provided. The method includes receiving from an image source a 3D image containing a plurality of images that are previously compressed, and storing pixel data of the received plurality of images. The method also includes determining that the plurality of images do not have a same number of pixel columns, determining at least one boundaries among the plurality of images, and determining a minimum number of pixel columns and a maximum number of pixel columns of the plurality of images. Further, the method includes adjusting any one of the plurality of images having a column number less than the maximum number such that each of the plurality of images has the maximum number of pixel columns, decompressing the plurality of images, and discarding from each of the decompressed plurality of images by a determined number of last columns, wherein the determined number is the difference between the maximum number and the minimum number.

17 Claims, 3 Drawing Sheets

| Left image pixel data | | | | | | Right image pixel data | | | | | | |
|---|---|---|---|---|---|---|---|---|---|---|---|---|
| 1 | 2 | 3 | ... | 50 | 51 | 52 | 53 | 54 | ... | 100 | 101 | 102 |

12

| | | |
|---|---|---|
| First storage unit 121 | Other pixel data | Left image pixel data |
| Second storage unit 122 | Right image pixel data | Other pixel data |

FIG. 2

| Left image pixel data | | | | | | Right image pixel data | | | | | |
|---|---|---|---|---|---|---|---|---|---|---|---|
| 1 | 2 | 3 | ... | 50 | 51 | 52 | 53 | 54 | ... | 100 | 101 |

FIG. 3

| Left image pixel data | | | | | | Right image pixel data | | | | | | |
|---|---|---|---|---|---|---|---|---|---|---|---|---|
| 1 | 2 | 3 | ... | 50 | 51 | 52 | 53 | 54 | ... | 100 | 101 | 102 |

FIG. 4

| Left image pixel data | | | | | | | | | | |
|---|---|---|---|---|---|---|---|---|---|---|
| 1 | 2 | 3 | 4 | 5 | ... | 98 | 99 | 100 | 101 | 102 |

FIG. 5A

| Right image pixel data | | | | | | | | | | |
|---|---|---|---|---|---|---|---|---|---|---|
| 1 | 2 | 3 | 4 | 5 | ... | 98 | 99 | 100 | 101 | 102 |

FIG. 5B

THREE-DIMENSIONAL (3D) IMAGE PROCESSING METHOD AND SYSTEM

CROSS-REFERENCES TO RELATED APPLICATIONS

This application claims the priority of Chinese patent application no. 201010226217.6 filed on Jul. 14, 2010, the entire contents of which are incorporated herein by reference.

FIELD OF THE INVENTION

The present invention relates to image processing and display technologies and, more particularly, to methods and systems for three-dimensional (3D) image processing and display.

BACKGROUND

The small distance between a viewer's left eye and right eye results in a small difference between the two viewpoints from the viewer's left eye and right eye. This difference in viewpoints generates a slight displacement between two scenes observed respectively by the viewer's left and right eyes. This displacement is also called the parallax between the left and right eyes which allows the viewer to perceive a three-dimensional (3D) effect.

When an image source transmits a 3D image to a display device, usually two images are required to be transmitted separately. One is provided to be viewed by a viewer's left eye (a left image); while the other is provided to be viewed by the viewer's right eye (a right image). Through the parallax between the left eye and right eye, the viewer can perceive a 3D image from the left image and the right image. A variety of transmission formats may be used to transmit the left image and the right image. One of the formats is a side-by-side format. Further, to be compatible with existing two-dimensional (2D) image transmission formats, which require only one image, the left and right images are separately compressed in the horizontal direction, with a compression ratio of 2:1, to ensure that the same amount of image data as 2D images is transmitted.

A 3D display device may have a window to display 3D images, called a 3D window. When the 3D window has an odd-number of pixel columns, the total pixels of the left image and the right image in the horizontal direction is also an odd number. Thus, if there is an error in determining the boundary between the left image and the right image, the last pixel of one image may be treated as the first pixel of the other image, or the first pixel of one image may be treated as the last pixel of the other image. Such error can create two possible undesired consequences in a final image generated from the left and right images: (1) if the difference between the pixel at the edge of the left image and the pixel at the edge of the right image is large, the decompressed image of the left image or the right image may have very different pixels at the edge because the pixels at the edge is generated from interpolation based on the mixed pixel value; and (2) the misplaced pixel from one image to the other is equivalent to a shift in space, which changes the parallax between the left image and the right image and may cause the viewer to feel a distortion of the depth of the 3D object associated with the left and right images.

The disclosed methods and systems are directed to solve one or more problems set forth above and other problems.

BRIEF SUMMARY OF THE DISCLOSURE

One aspect of the present disclosure includes a three-dimensional (3D) image processing method. The method includes receiving from an image source a 3D image containing a plurality of images that are previously compressed, and storing pixel data of the received plurality of images. The method also includes determining that the plurality of images do not have a same number of pixel columns, determining at least one boundaries between the plurality of images, and determining a minimum number of pixel columns and a maximum number of pixel columns of the plurality of images. Further, the method includes adjusting any one of the plurality of images having a column number less than the maximum number such that each of the plurality of images has the maximum number of pixel columns, decompressing the plurality of images, and discarding from each of the decompressed plurality of images by a determined number of last columns, wherein the determined number is the difference between the maximum number and the minimum number.

Another aspect of the present disclosure includes a 3D display system. The 3D display system includes a source image providing module, a register, and a microprocessing unit. The source image providing module is configured to provide a 3D image containing a plurality of images previously compressed. The register is configured to determine at least one boundaries between the plurality of images, and to determine a minimum number of pixel columns and a maximum number of pixel columns of the plurality of images. Further, the microprocessing unit is configured to adjust any one of the plurality of images having a column number less than the maximum number such that each of the plurality of images has the maximum number of pixel columns, to decompress the plurality of images, and to discard from each of the decompressed plurality of images by a determined number of last columns, wherein the determined number is the difference between the maximum number and the minimum number.

Another aspect of the present disclosure includes a semiconductor chip. The semiconductor chip includes an input interface, a register, and a microprocessing unit. The input interface is configured to receive a three-dimensional (3D) image containing a plurality of images previously compressed. The register is configured to determine at least one boundaries between the plurality of images, and to determine a minimum number of pixel columns and a maximum number of pixel columns of the plurality of images. Further, the microprocessing unit is configured to adjust any one of the plurality of images having a column number less than the maximum number such that each of the plurality of images has the maximum number of pixel columns, to decompress the plurality of images, and to discard from each of the decompressed plurality of images by a determined number of last columns, wherein the determined number is the difference between the maximum number and the minimum number.

Other aspects of the present disclosure can be understood by those skilled in the art in light of the description, the claims, and the drawings of the present disclosure.

BRIEF DESCRIPTION OF THE DRAWINGS

FIG. 2 illustrates an exemplary register consistent with the disclosed embodiments;

FIG. 3 illustrates an exemplary image data arrangement consistent with the disclosed embodiments;

FIG. 4 illustrates another exemplary image data arrangement consistent with the disclosed embodiments;

FIG. 5A illustrates another exemplary image data arrangement consistent with the disclosed embodiments; and FIG. 5B illustrates another exemplary image data arrangement consistent with the disclosed embodiments.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1A:
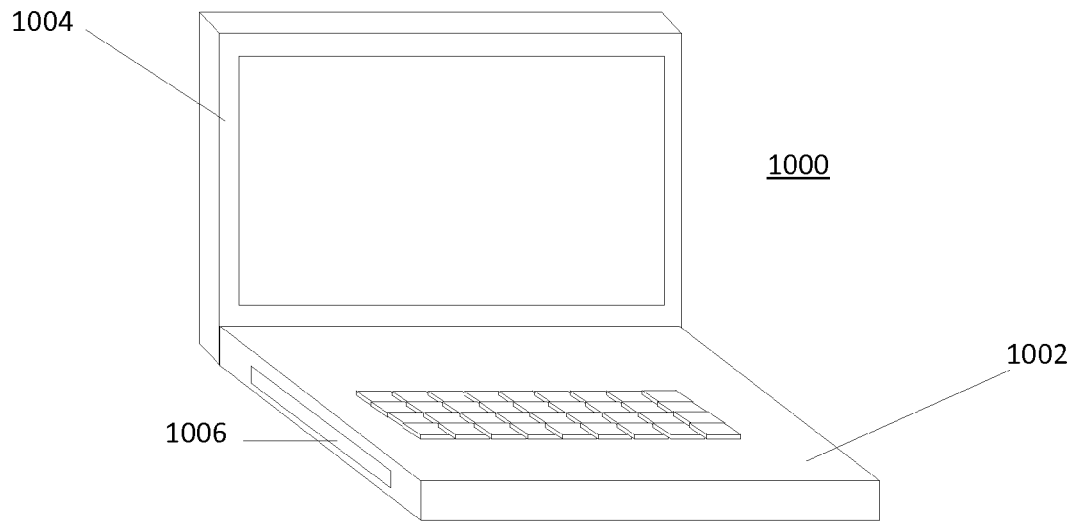
FIG. 1A shows an exemplary environment incorporating certain aspects of the invention.

FIG. 1A shows an exemplary environment incorporating certain aspects of the invention. As shown in FIG. 1, a three-dimensional (3D) display system 1000 may include a base 1002, a 3D display screen 1004, and an information source 1006. 3D display device 1000 may include any appropriate device that capable of processing and displaying 3D video images, such as a computer, a television set, a smart phone, or a consumer electronic device. Although 3D display system 1000 is shown as a notebook computer, any device with computing power may be included.

Base 1002 may include any appropriate structures and components to support operation of 3D display system 1000. 3D display screen 1004 may include any appropriate display screen based on plasma display panel (PDP) display, cathode ray tube (CRT) display, liquid crystal display (LCD), organic light emitting diode (OLED) display, or other types of displays. 3D display screen 1004 may also include any appropriate optical devices such as a lenticular lens screen or a parallax barrier to facilitate 3D displays. During operation, one or more display windows may be opened on 3D display screen 1004 for displaying 3D images.

Further, information source 106 may include any appropriate sources of information used by 3D display system 1000, such as a DVD or CDROM device, a set top box, a digital receiver, a network adapter, a TV tuner, an information storage device, a hard disk or flash disk, or other media players.

Figure 1B:
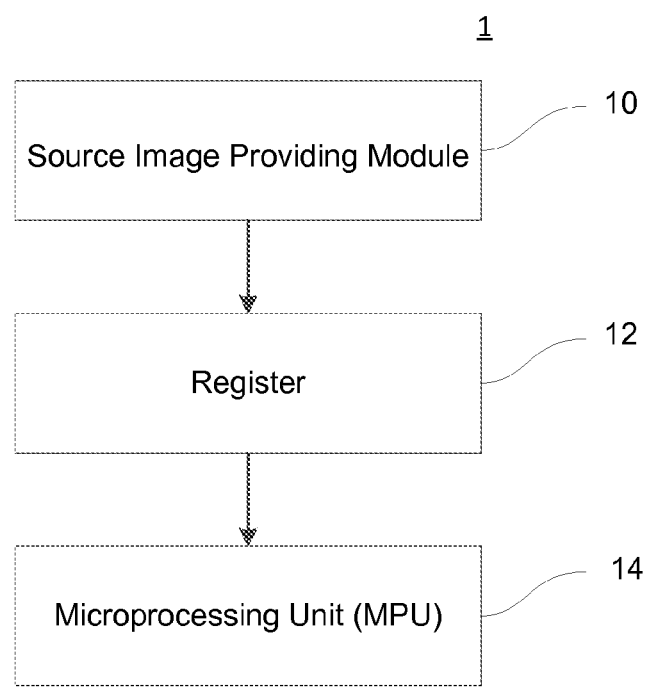
FIG. 1B illustrates an exemplary image processing unit consistent with the disclosed embodiments.

FIG. 1B illustrates an exemplary image processing unit 1 of 3D display system 1000. As shown in FIG. 1B, image processing unit 1 includes a source image providing module 10, a register 12, and a microprocessing unit 14. Other components may also be included.

Source image providing module 10 may provide image processing unit 1 with a 3D image including a plurality of images from different viewpoints. Further, the plurality of images may be compressed for transmission. For example, a horizontal compression may be applied to compress the plurality of images separately. Further, compressed plurality of images may be transmitted in various transmission formats including a side-by-side transmission format.

Register 12 may include any appropriate hardware or software registers or storage units to be used for determining a boundary or boundaries among the plurality of images. Register 12 may be configured by certain software programs, such as programs from a media player or from an image source, to determine the boundary or boundaries between the plurality of images in the 3D image. That is, register 12 may be a programmable register that is capable of being programmed by any appropriate device or software program.

Microprocessing unit 14 may be coupled to register 12 and any other components to control and operate image processing unit 1. Microprocessing unit 14 may include any appropriate type of graphic processing unit (GPU), general purpose microprocessor, digital signal processor (DSP) or microcontroller, and application specific integrated circuit (ASIC). Further, microprocessing unit 14 may execute sequences of computer program instructions to perform various processes associated with 3D display system 100. In certain embodiments, image processing unit 1 including source image providing module 10, register 12, and microprocessing unit 14 may be implemented in a single processor or a single semiconductor chip, in which case source image providing module 10 may include an input interface to receive the 3D image including a plurality of images from different viewpoints.

During operation, source image providing module 10 provides a compressed image including pixel data of a plurality of compressed images with parallax. Microprocessing unit 14 may verify whether the total pixel number of each of the plurality of images in a horizontal direction or a line of the 3D image is equal. For example, if the 3D image is a stereo (two viewpoints) 3D image, the 3D image includes a left image (to be viewed by a viewer's left eye or of a left viewpoint) and a right image (to be viewed by the viewer's right eye or of a right viewpoint). Microprocessing unit 14 may verify whether, in a line of pixels of the 3D image, the number of pixels of the left image is equal to the number of pixels of the right image.

If the number of pixels of the left image is equal to the number of pixels of the right image, each image makes half of the total pixels. In this case, it is easy to detect the border or boundary between the left image and the right image, and to accurately decompress the left and right image data.

On the other hand, if the number of pixels of the left image is not equal to the number of pixels of the right image in one line or horizontally, register 12 may be used to determine the boundary between the left and the right images. For example, if the total number of pixels of one line of a display window or display screen is 101 (one hundred and one pixels), it is obvious that the left image and the right image would have unequal pixels in one line. The first possible form of the line of pixels is 50 left image pixels and 51 right image pixels, and the second possible form of the line of pixels is 51 left image pixels and 50 right image pixels.

The compressed image data including the left image and the right image is received by and buffered in, for example, register 12. FIG. 2 shows an exemplary register structure consistent with the disclosed embodiments. As shown in FIG. 2, register 12 may include a first storage unit 121 and a second storage unit 122. If the received image data is for the left image or any pixel before the left image, the received image data is stored in first storage unit 121, with the left image pixels taking the right side of first storage unit 121, as shown.

On the other hand, if the received image data is for the right image or any pixel after the right image, the received image data is stored in second storage unit 122, with the right image taking the left side of the second storage unit 122, as shown. During determining whether to store received image data in first storage unit 121 or second storage unit 122, if the total number of pixels of the display window is an odd number, register 12 records the number of pixels of the left image and the number of pixels of the right image. These numbers may then be provided to hardware (e.g., display hardware or any logic circuitry of imaging processing unit 1 or display system 100) such that the hardware can identify the boundary between the left and the right images.

Microprocessing unit 14 may then read the left and right image pixel data from register 12 and process the image pixel data. The left and right image pixel data needs to be read out at the same time in order to generate the corresponding 3D image. When the pixel or pixel-column numbers are not equal between the left image and the right image, for example, the left image has one more or less column of pixels than the right image, a specific configuration of register 12 may determine whether a boundary pixel should belong to the left image or the right image. For example, as shown in FIG. 3, the configuration of register 12 indicates that a total of 101 columns of pixels for the left image and the right image. The configuration of or a program in register 12 may set the pixel column 51 as the last column of pixel of the left image. Thus, the left image pixel data is in column 1, column 2, column 3, . . . , column 51 with a total of 51 columns of pixels; while the right image pixel data is in column 52, column 53, column 54, . . . , column 101 with a total of 50 columns.

Further, the left image and the right image may be decompressed using a specific decompression algorithm. After decompression, a total of 101 columns of pixel data may need to recover the original image for the display window (e.g., with 101 pixels). However, based on standard decompression algorithms, a total of 51 columns of the left image pixel data can be decompressed to a total of 102 (one hundred and two) columns of the original left image pixel data, and a total of 50 columns of the right image pixel data can be decompressed to a total of 100 (one hundred) columns of the original right image data. Neither of the total column numbers fits in the display window.

To maintain the continuity of image data, as shown in FIG. 4, microprocessing unit 14 may replicate the last column of the right image. That is, microprocessing unit may copy column 101 to a new column 102. Thus, during data decompression, microprocessing unit 14 may decompress column 1 to column 51 of the left image to generate a total of 102 columns of the original left image; and may decompress column 52 to column 102 of the right image to generate a total of 102 columns of the original right image.

Further, microprocessing unit 14 may discard column 102 of the original left image and column 102 of the original right image. That is, microprocessing unit 14 may discard the last column of the decompressed left image and the last column of the decompressed right images to keep the total column number remaining at 101 for both the decompressed left image and the decompressed right image, as shown in FIGS. 5A and 5B, respectively.

In addition, register 12 may also be configured or programmed to set column 51 as the first column of the right image. That is, the left image pixels are in column 1 to column 50 with a total of 50 columns, and the right image pixels are in column 51 to column 101 with a total of 51 columns. Similar to the above examples, microprocessing unit 14 may replicate the last column of the left image, and also discard the last column of the decompressed left image and the decompressed right image.

Although the above examples use a stereo 3D image including two images with parallax (e.g., the left image and the right image), any number of images, such as 3, 4, . . . , may be used. In the case of multiple images, similar ways may be used to process multiple compressed images. For example, similar to above examples, register 12 may determine a minimum number n of columns and a maximum number m of columns among the multiple image, and microprocessing unit 14 may adjust any image with a column number less than m to m columns, where m and n are integers, using a similar duplication method.

During duplication, the last column of each image to be adjusted may be duplicated as the required number of columns in order to have m columns, or the last (m−a) columns of each image to be adjusted may be duplicated as the required number of columns, where a is the total column number of each image to be adjusted. The duplicated columns may then be added to have a total of m number of columns. Further, after decompressing the multiple images, microprocessing unit 14 may discard the last (m−n) column such that all decompressed images have the same number of columns of pixels for a particular 3D display window.

Further, although the above examples use horizontal compressions, the same principle and methods can be applied to vertical compressions as well.

By using a register and microprocessing unit to determine boundaries of multiple images in a compressed 3D image and dynamically adjusting columns of the multiple images, the multiple images may be decompressed and recovered more accurately and may provide a better user experience.

What is claimed is:

1. A three-dimensional (3D) image processing method, comprising:
    receiving from an image source a 3D image containing a plurality of images previously compressed, wherein the plurality of images are from different viewpoints of the 3D image with certain parallax and transmitted in a single frame;
    storing pixel data of the received plurality of images;
    determining that the plurality of images of the 3D image do not have a same number of pixel columns;
    determining at least one boundaries between the plurality of images of the 3D image;
    determining a minimum number of pixel columns and a maximum number of pixel columns of the plurality of images of the 3D image in the single frame based on the at least one boundaries between the plurality of images of the 3D image;
    adjusting any one of the plurality of images of the 3D image having a column number less than the maximum number such that each of the plurality of images of the 3D image has the maximum number of pixel columns;
    decompressing the plurality of images of the 3D image; and
    discarding from each of the decompressed plurality of images of the 3D image by a determined number of last columns, wherein the determined number is the difference between the maximum number and the minimum number.

2. The method according to claim 1, wherein determining the boundaries further includes:
    determining the at least one boundaries between the plurality of images of the 3D image based on a register, wherein the register records a number of pixel columns of each of the plurality of images.

3. The method according to claim 1, wherein
    the plurality of images of the 3D image include a first image and a second image.

4. The method according to claim 3, wherein storing further includes:
    when received pixel data is from the first image or pixels before the first image, storing the received pixel data in a first storage unit of a register; and
    when the received pixel data is from the second image or pixels after the second image, storing the received pixel data in a second storage unit of the register.

5. The method according to claim 1, wherein adjusting further includes:
    determining a current column number of one of the plurality of images of the 3D image;
    determining a required number of columns to be added as the difference between the maximum number and the current column number;

duplicating the last required number of columns of the one of the plurality of images; and adding the duplicated last required number of columns to the one of the plurality of images to have the maximum number of columns.

6. The method according to claim 1, wherein:
the plurality of images of the 3D image are compressed horizontally.

7. The method according to claim 1, wherein:
a total number of pixel columns of the plurality of images is an odd number.

8. A three-dimensional (3D) display system, comprising:
a source image providing module configured to provide a 3D image containing a plurality of images previously compressed, wherein the plurality of images are from different viewpoints of the 3D image with certain parallax and transmitted in a single frame;
a register configured to:
determine at least one boundaries between the plurality of images of the 3D image; and
determine a minimum number of pixel columns and a maximum number of pixel columns of the plurality of images of the 3D image in the single frame based on the at least one boundaries between the plurality of images of the 3D image; and
a microprocessing unit configured to
adjust any one of the plurality of images of the 3D image having a column number less than the maximum number such that each of the plurality of images has the maximum number of pixel columns;
decompress the plurality of images of the 3D image; and
discard from each of the decompressed plurality of images of the 3D image by a determined number of last columns, wherein the determined number is the difference between the maximum number and the minimum number.

9. The 3D display system according to claim 8, wherein the register is a programmable register.

10. The 3D display system according to claim 8, wherein the plurality of images include a first image and a second image, and the register is further configured to:
when received pixel data is from the first image or pixels before the first image, store the received pixel data in a first storage unit; and
when the received pixel data is from the second image or pixels after the second image, store the received pixel data in a second storage unit.

11. The 3D display system according to claim 8, wherein, to adjust any one of the plurality of images, the microprocessing unit is further configured to:
determine a current column number of one of the plurality of images of the 3D image;
determine a required number of columns to be added as the difference between the maximum number and the current column number;
duplicate the last required number of columns of the one of the plurality of images of the 3D image; and add the duplicated last required number of columns to the one of the plurality of images of the 3D image to have the maximum number of columns.

12. The 3D display system according to claim 8, wherein:
the plurality of images of the 3D image are compressed horizontally.

13. A semiconductor chip, comprising:
an input interface configured to receive a three-dimensional (3D) image containing a plurality of images previously compressed, wherein the plurality of images are from different viewpoints of the 3D image with certain parallax and transmitted in a single frame;
a register configured to:
determine at least one boundaries between the plurality of images of the 3D image; and
determine a minimum number of pixel columns and a maximum number of pixel columns of the plurality of images of the 3D image in the single frame based on the at least one boundaries between the plurality of images of the 3D image; and
a microprocessing unit configured to
adjust any one of the plurality of images of the 3D image having a column number less than the maximum number such that each of the plurality of images of the 3D image has the maximum number of pixel columns;
decompress the plurality of images of the 3D image; and
discard from each of the decompressed plurality of images of the 3D image by a determined number of last columns, wherein the determined number is the difference between the maximum number and the minimum number.

14. The semiconductor chip according to claim 13, wherein
the register is a programmable register.

15. The semiconductor chip according to claim 13, wherein the plurality of images of the 3D image include a first image and a second image, and the register is further configured to:
when received pixel data is from the first image or pixels before the first image, store the received pixel data in a first storage unit; and
when the received pixel data is from the second image or pixels after the second image, store the received pixel data in a second storage unit.

16. The semiconductor chip according to claim 13, wherein, to adjust any one of the plurality of images, the microprocessing unit is further configured to:
determine a current column number of one of the plurality of images of the 3D image;
determine a required number of columns to be added as the difference between the maximum number and the current column number;
duplicate the last required number of columns of the one of the plurality of images of the 3D image; and
add the duplicated last required number of columns to the one of the plurality of images of the 3D image to have the maximum number of columns.

17. The semiconductor chip according to claim 13, wherein:
the plurality of images of the 3D image are compressed horizontally.

* * * * *